Sept. 15, 1953 R. P. WORTHEN 2,652,079
CONVERTIBLE SAWHORSE AND WORK SUPPORT
Filed May 11, 1951
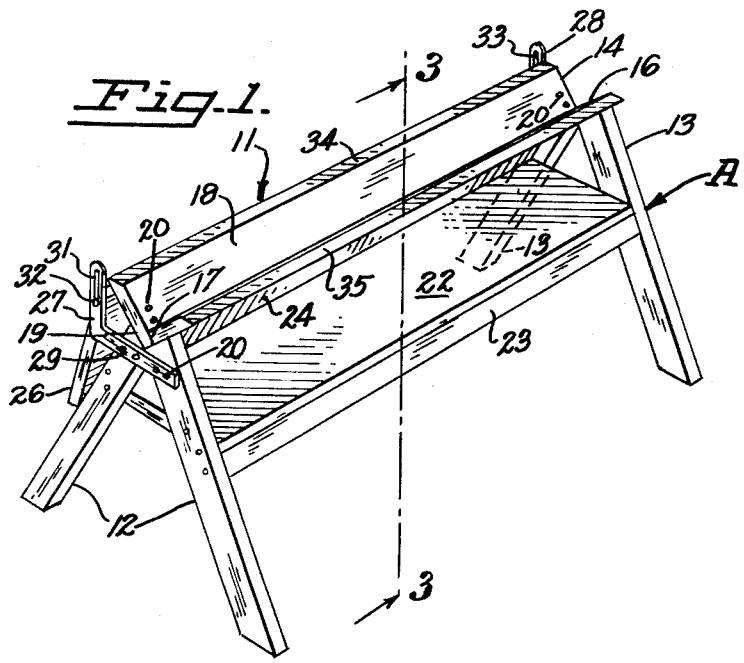
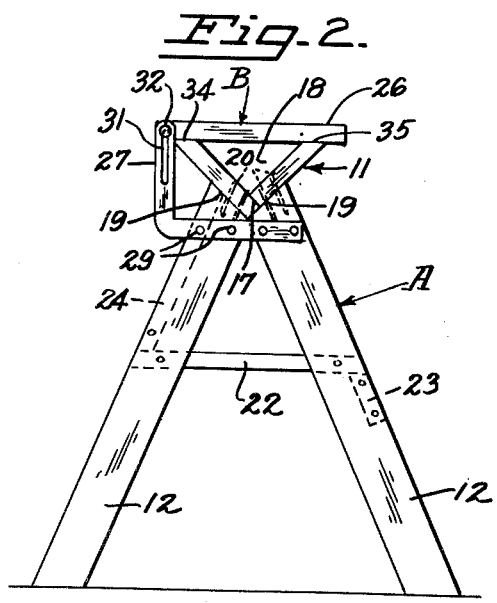
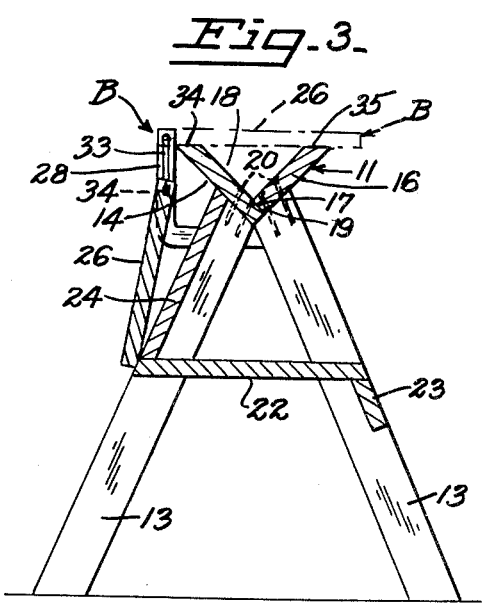
INVENTOR.
RICHARD P. WORTHEN
BY
Townsend and Townsend
ATTORNEYS Patented Sept. 15, 1953

2,652,079

UNITED STATES PATENT OFFICE 2,652,079

CONVERTIBLE SAWHORSE AND WORK SUPPORT

Richard P. Worthen, Modesto, Calif.

Application May 11, 1951, Serial No. 225,759

1 Claim. (Cl. 144—288)

This invention relates to a new and improved carpenter's work-bench construction.

The particular embodiment of the invention which is illustrated in the drawings and which will be described hereinafter in greater detail comprises, generally, a saw horse assembly incorporating an elongated work-piece supporting member which, in turn, is supported adjacent its opposite ends by more or less conventional A-frame type legs. The work-piece supporting member is formed to present a V-shaped trough adapted to receive and support a length of board to be sawed and substantially prevent lateral displacement of said board during the sawing thereof. A bench-top, connected hingedly to the saw horse assembly, is arranged for movement to and away from flat overlying position with respect to the troughed work-piece supporting member. The construction is such that when the bench-top is moved to its overlying position with respect to the work-piece supporting member the underside of said bench-top rests upon the top edges of the trough member, which, in turn, provide a firm and stable support for the bench-top. Preferably, the A-frame legs support between them a longitudinally extending shelf member, which, in conjunction with other elements of the construction to be hereinafter more particularly designated, provide both adequate longitudinal and transverse rigidity and stability to the construction.

A principal object of the present invention, therefore, is to provide a novel bench-construction possessing, generally, the characteristics briefly noted hereinabove, and which is particularly adaptable for use by children as a work-bench unit. More particularly, it is a principal object of the invention to provide a compact unit of the type briefly mentioned above, which incorporates, and provides for, a flat work-bench surface on which various types of work can be performed, in addition to a novel saw horse structure on which lenths of boards may be positioned and manually held against displacement or movement during the sawing thereof.

Numerous other objects and advantages of the present invention will become apparent upon reading the following specification and referring to the accompanying drawings in which similar characters of reference represent corresponding parts in each of the several views.

In the drawings:

Fig. 1 is a perspective view of an embodiment of the invention showing the bench-top in "down" or non-supported position.

Fig. 2 is a view in side elevation of the invention showing the bench-top in its "up" or supported position.

Fig. 3 is a view in section taken on line 3—3 of Fig. 1.

Referring now more particularly to the drawings, the embodiment of the invention therein illustrated comprises, generally, a saw horse assembly, indicated generally at A, and a bench-top assembly, indicated generally at B.

The saw horse assembly A comprises, more specifically, a work-piece supporting member, indicated generally at 11, which is supported adjacent its opposite ends by a pair of A-frames, indicated at 12 and 13, respectively. The work-piece supporting member 11 may comprise two elongate, relatively flat boards, indicated at 14 and 16, respectively, which abut against one another along their contiguous longitudinal, marginal edges, as indicated at 17. In the embodiment of the construction illustrated, the boards 14 and 16 are shown as being disposed substantially at right angles to one another to form an open, upwardly facing, V-shaped trough, designated at 18. The top portions of the A-frame legs are preferably mitered, such as indicated at 19, to receive in nested relationship the trough-forming boards 14 and 16. Boards 14 and 16 are preferably secured to the A-frame legs by means of screws or nails, as indicated at 20, for example.

The A-frames support between them a longitudinally extending shelf 22 which may be utilized as a shelf support for tools or other working instruments or materials.

There is also shown a longitudinally extending front brace 23, which forms a depending skirt for the shelf 22, and a back-board 24, which is nailed, screwed, or otherwise suitably secured to the A-frame legs. The shelf 22, brace 23, and backboard 24 cooperate to provide both longitudinal and transverse rigidity to the construction.

The bench-top assembly, heretofore designated generally at B, comprises, more specifically, an elongate, relatively wide and flat bench-board or table-top 26 extending the entire length of the saw horse, and a pair of similarly formed L-shaped brackets 27 and 28, secured by nails or screws, as indicated at 29, to the A-frame legs. The upwardly extending arm of each bracket is formed with a longitudinal slot adapted to slidably and rotatably retain a suitable hinge pin. More particularly, bracket 27 is formed with a slot 31 which retains slidably and rotatably hinge pin 32 which projects outwardly from the adjacent end of tabletop 26. Similarly, the upper arm of bracket 28 is formed with a slot 33 which rotatably and slidably supports hinge pin 34 projecting outwardly from the other end of tabletop 26.

Although not essential to the practical operativeness of the device, the top edges of boards 14 and 16 are preferably bevelled as at 34 and 35, respectively, so as to present relatively flat benchtop supporting surfaces. It is thus seen that the bench-top may be swung from its "down" position (shown in Figs. 1 and 3) to its "up" position (shown in Fig. 2) whereat said bench-top overlies and is supported adjacent its two lengthwise margins on board edges 34 and 35.

Trough 18 provides a convenient and readily accessible means for supporting in firm nested relationship lengths of board or lumber to be sawed. Unskilled workers, and particularly children, often find it difficult to manually hold a board sufficiently immobile while sawing through the same. The trough construction incorporated in the instant device greatly facilitates the manual holding of a board against lateral displacement thereof during sawing operations. The hinge construction comprising slotted brackets 27 and 28 which respectively retain pins 32 and 34 permits the bench-top to be swung easily and rapidly from its "up" position to "down" positions, and vice versa. Moreover, because of the vertical slots formed in the brackets, the benchtop may be swung both rearwardly and downwardly to a position well below the top portion of the saw horse structure and well out of the way of any working activity which a worker may wish to perform solely in connection with the saw horse assembly.

Although the present invention has been described in some detail by way of illustration and example for purposes of clarity of understanding, it is understood that certain changes and modifications may be made within the spirit of the invention and scope of the claim appended hereto.

I claim:

A work-bench construction comprising; a saw horse assembly including an elongate work-piece support, said work-piece support comprising two longitudinally extending relatively flat boards joined together along contiguous longitudinal marginal edges and disposed angularly to one another defining an upwardly facing V-shaped trough, a pair of similarly formed A-frames supporting said work-piece support adjacent opposite ends thereof, a bench top hingedly mounted by a hinge means under said saw horse, said hinge means comprising a pair of L-shaped brackets disposed adjacent opposite ends of said bench-top, each bracket having a longitudinal slot formed in one arm thereof and secured to said saw horse with the slotted arm thereof projecting upwardly, a hinge pin projecting outwardly from each end of said bench-top whereby said bench-top may be swung toward and away from an overlying position with respect to said work-piece support and moved slidably downwardly within said slotted bracket arms to a point below the top surface of said work-piece support.

RICHARD P. WORTHEN.

References Cited in the file of this patent

UNITED STATES PATENTS

| Number | Name | Date |
| --- | --- | --- |
| 867,661 | Keating | Oct. 8, 1907 |
| 1,092,180 | Smith | Apr. 7, 1914 |
| 1,266,173 | Swanson | May 14, 1918 |
| 1,802,202 | Doland | Apr. 21, 1931 |
| 1,819,252 | Linsner | Aug. 18, 1931 |
| 2,311,149 | Worth | Feb. 6, 1943 |
| 2,412,395 | Goosmann | Dec. 10, 1946 |
| 2,541,508 | Fleming | Feb. 13, 1951 |

FOREIGN PATENTS

| Number | Country | Date |
| --- | --- | --- |
| 197,467 | Great Britain | May 17, 1923 |